US008416253B2

(12) United States Patent
Minematsu et al.

(10) Patent No.: US 8,416,253 B2
(45) Date of Patent: Apr. 9, 2013

(54) APPARATUS, METHOD, AND RECORDING MEDIUM FOR DETECTING UPDATE OF IMAGE INFORMATION

(75) Inventors: Mika Minematsu, Kawasaki (JP); Masataka Goto, Yokohama (JP); Yasuyuki Nishibayashi, Kawasaki (JP); Shinya Murai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1159 days.

(21) Appl. No.: 12/314,244

(22) Filed: Dec. 5, 2008

(65) Prior Publication Data

US 2009/0147014 A1 Jun. 11, 2009

(30) Foreign Application Priority Data

Dec. 11, 2007 (JP) ................. 2007-319351

(51) Int. Cl.
*G09G 5/36* (2006.01)
*G06F 9/455* (2006.01)

(52) U.S. Cl.
USPC ................. 345/545; 345/556; 718/1

(58) Field of Classification Search .......... 345/556, 345/545; 718/1
See application file for complete search history.

(56) References Cited

U.S. PATENT DOCUMENTS

| 5,506,975 | A | 4/1996 | Onodera |
| 6,005,592 | A | 12/1999 | Koizumi et al. |
| 6,470,376 | B1 | 10/2002 | Tanaka et al. |
| 6,559,855 | B1 | 5/2003 | Kawase et al. |
| 6,601,233 | B1 | 7/2003 | Underwood |
| 6,615,303 | B1 | 9/2003 | Endo et al. |
| 6,957,186 | B1 | 10/2005 | Guheen et al. |
| 7,072,934 | B2 | 7/2006 | Helgeson et al. |
| 7,130,807 | B1 | 10/2006 | Mikurak |
| 7,181,679 | B1 | 2/2007 | Taylor |
| 7,272,799 | B2 | 9/2007 | Imada et al. |
| 7,368,918 | B2 | 5/2008 | Henson et al. |
| 7,380,236 | B2 | 5/2008 | Hawley |

(Continued)

FOREIGN PATENT DOCUMENTS

| JP | 10-105367 | 4/1998 |
| JP | 10-200757 | 7/1998 |

(Continued)

OTHER PUBLICATIONS

Lin Tan et al.; "iKERNEL: Isolating Buggy and Malicious Device Drivers Using Hardware Virtualization Support"; Third IEEE International Symposium on Dependable, Autonomic and Secure Computing; IEEE Computer Society 2007; pp. 134-142.

(Continued)

*Primary Examiner* — Ke Xiao
*Assistant Examiner* — Robert Craddock
(74) *Attorney, Agent, or Firm* — Nixon & Vanderhye, P.C.

(57) ABSTRACT

When a processor, which transits from a first mode that causes a guest operating system to operate to a second mode that causes a virtual machine monitor managing the guest operating system to operate, when previously set transition condition is satisfied, transits to the second mode, a determining unit determines a cause or the transition. When it is determined that an execution of a process related to a completion of writing the image information in an image storage unit on the guest operating system is the cause, a detecting unit detects an updated portion representing an unmatched portion of the image information between before and after writing.

9 Claims, 10 Drawing Sheets

U.S. PATENT DOCUMENTS

| | | | |
|---|---|---|---|
| 7,418,584 B1 * | 8/2008 | Klaiber et al. | 712/229 |
| 7,457,656 B2 | 11/2008 | Judd et al. | |
| 7,506,265 B1 | 3/2009 | Traut et al. | |
| 7,577,722 B1 | 8/2009 | Khandekar et al. | |
| 7,634,681 B2 | 12/2009 | Takamoto et al. | |
| 7,680,919 B2 | 3/2010 | Nelson | |
| 7,720,672 B1 | 5/2010 | Buswell et al. | |
| 8,045,828 B2 | 10/2011 | Goto et al. | |
| 2003/0001853 A1 | 1/2003 | Obayashi | |
| 2005/0108440 A1 | 5/2005 | Baumberger et al. | |
| 2005/0132364 A1 | 6/2005 | Tewari et al. | |
| 2006/0005189 A1 | 1/2006 | Vega et al. | |
| 2006/0092466 A1 | 5/2006 | Ikeda | |
| 2006/0187217 A1 | 8/2006 | Son et al. | |
| 2006/0279578 A1 * | 12/2006 | Karlov | 345/545 |
| 2007/0067739 A1 | 3/2007 | Atarashi et al. | |
| 2007/0271560 A1 | 11/2007 | Wahlert et al. | |
| 2007/0300220 A1 | 12/2007 | Seliger et al. | |
| 2007/0300221 A1 | 12/2007 | Hartz et al. | |
| 2008/0104608 A1 | 5/2008 | Hyser et al. | |
| 2008/0229227 A1 | 9/2008 | Bantz et al. | |
| 2008/0235361 A1 | 9/2008 | Crosbie et al. | |
| 2008/0244577 A1 | 10/2008 | Le et al. | |
| 2008/0244579 A1 | 10/2008 | Muller | |
| 2008/0301673 A1 | 12/2008 | Kawasaki et al. | |
| 2009/0016566 A1 | 1/2009 | Goto et al. | |
| 2009/0077361 A1 | 3/2009 | Neiger et al. | |
| 2009/0112972 A1 | 4/2009 | Liu | |
| 2009/0147014 A1 | 6/2009 | Minematsu et al. | |
| 2009/0193414 A1 | 7/2009 | Broussard et al. | |
| 2009/0198809 A1 | 8/2009 | Goto et al. | |
| 2009/0300605 A1 | 12/2009 | Edwards et al. | |
| 2010/0088699 A1 | 4/2010 | Sasaki | |
| 2010/0186012 A1 | 7/2010 | Imada et al. | |

FOREIGN PATENT DOCUMENTS

| | | |
|---|---|---|
| JP | 10-307731 | 11/1998 |
| JP | 11-331610 | 11/1999 |
| JP | 2000-330806 | 11/2000 |
| JP | 2003-084751 | 3/2003 |
| JP | 20003-085135 | 3/2003 |
| JP | 2004-086550 | 3/2004 |
| JP | 2007-025073 | 2/2007 |

OTHER PUBLICATIONS

Anonymous; "Double Buffering and Page Flipping"; Internet Article May 9, 2001, pp. 1-3; XP-002516561; URL: http://web.archive.org/web/20010509192614/http://java.sun.com/docs/books/tutorial/extra/fullscreen/doublebuf.html; retrieved Feb. 23, 2009; pp. 2-3.

Adams K.; "Graphics and I/O Virtualization"; Internet Article Dec. 16, 2005, pp. 1-2; XP002516562; URL:http//www.x86vmm.blogspot.com/2005/12/graphics-and-io-virtulization.html; retrieved Feb. 20, 2009; p. 1.

Office Action dated Jan. 4, 2012 in JP Application No. 2007-319351 with English-language translation.

"Suspending and Resuming Virtual Machines," http://www.vmware.com/support/esx2/doc/esxadmin_remote-console8.html#1004281.

Goto et al., U.S. Appl. No. 12/320,212, filed Jan. 21, 2009.

Goto et al., U.S. Appl. No. 12/073,841, filed Mar. 11, 2008.

"What is Xen", [Online], http://xen.org/, retrieved Aug. 1, 2008.

"Virtualization via Hypervisor, Virtual Machine & Server Consolidation", [Online], http://www.vmware.com/, retrieved Aug. 1, 2008.

U.S. Appl. No. 12/073,841.

* cited by examiner

SINGLE BUFFERING

DOUBLE BUFFERING

APPARATUS, METHOD, AND RECORDING MEDIUM FOR DETECTING UPDATE OF IMAGE INFORMATION

CROSS-REFERENCE TO RELATED APPLICATIONS

This application is based upon and claims the benefit of priority from the prior Japanese Patent Application No. 2007-319351, filed on Dec. 11, 2007; the entire contents of which are incorporated herein by reference.

BACKGROUND OF THE INVENTION

1. Field of the Invention

The present invention relates to an apparatus, a method, and a computer-readable recording medium for detecting an update of image information written by an application or the like running on a virtual machine.

2. Description of the Related Art

A virtual machine environment in which a plurality of virtual machines is operated by single hardware is implemented in recent years. For example, Xen (http://xen.org/) and VMware (http://vmware.com/) are known as software to control execution of a virtual machine.

A plurality of guest operating systems (OSs) runs on a virtual machine monitor (VMM) in the virtual machine environment. The VMM arbitrates accesses of the guest OSs to a hardware resource. Generally, the VMM controls an access to a network card or the like which is a shared resource, but is not involved in an access of a guest OS to a graphic memory or the like allocated to each guest OS. Therefore, when a screen is to be updated, the guest OS draws image information in the graphic memory, and the VMM has to update the screen based on the image information. However, because the VMM is not involved in the access of the guest OS to the graphic memory, the drawing event of the guest OS is not transmitted to the VMM. The VMM, therefore, needs to have a function of detecting drawing completion by the guest OS and updating the screen.

The way the VMM updates the screen in response to the reception of notification from the guest OS includes two methods as follows.

(1) The VMM detects screen update without explicit notification from the guest OS.

(2) The screen update is explicitly notified from the guest OS to the VMM.

For example, the method of (1) is used in Xen. Specifically, a technique for use in Xen is to poll from the VMM to the guest OS using a timer and check whether the screen is updated without modification of the guest OS.

Meanwhile, the method of (2) is used in VMWare. Specifically, a technique for use in VMWare is to modify a video driver of the guest OS and issue a notification on screen update from the video driver of the guest OS to the VMM at a breakpoint of drawing.

However, in the method of (1), the timing of finishing the drawing in the graphic memory is not detected, and this may cause an image in the middle of drawing to be displayed. Further, in the method of (2), it is necessary to modify the video driver of the guest OS according to a virtual machine environment, which lacks versatility.

SUMMARY OF THE INVENTION

According to one aspect of the present invention, there is provided an apparatus for detecting an update of image information. The apparatus includes an image storage unit that stores image information; a processor that transits, when previously set transition condition is satisfied, from a first mode that causes a guest operating system to operate to a second mode that causes a virtual machine monitor managing the guest operating system to operate; a determining unit that determines, when the processor that transits to the second mode, a cause of the transition; and a detecting unit that detects, when the determining unit determines that an execution of a process related to a completion of writing the image information in the image storage unit on the guest operating system is the cause, an updated portion representing an unmatched portion of the image information between before and after writing.

Furthermore, according to another aspect of the present invention, there is provided a method of detecting an update of image information. The method includes determining, a processor that transits from a first mode that causes a guest operating system to operate to a second mode that causes a virtual machine monitor managing the guest operating system to operate when previously set transition condition is satisfied, when the processor transits to the second mode, a cause of the transition; and detecting, when it is determined that an execution of a process related to a completion of writing the image information in an image storage unit on the guest operating system is the cause, an updated portion representing an unmatched portion of the image information between before and after writing.

Moreover, according to still another aspect of the present invention, there is provided a computer-readable recording medium that stores therein a computer program for detecting an update of image information. The computer program when executed causes a computer to execute determining, a processor that transits from a first mode that causes a guest operating system to operate to a second mode that causes a virtual machine monitor managing the guest operating system to operate when previously set transition condition is satisfied, when the processor transits to the second mode, the cause of the transition; and detecting, when it is determined that an execution of a process related to a completion of writing the image information in an image storage unit on the guest operating system is the cause, an updated portion representing an unmatched portion of the image information between before and after writing.

DETAILED DESCRIPTION OF THE INVENTION

Figure 1:
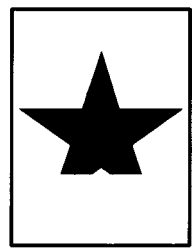
FIG. 1 is a schematic of an example of a display screen using single buffering.

Exemplary embodiments of the present invention are explained in detail below with reference to the accompanying drawings.

An image processing apparatus according to a first embodiment of the present invention includes a processor that supports virtualization at a hardware level, and a video driver that executes a function which accesses a predetermined register when a drawing is completed. The processor is set so that the control moves to a VMM upon access to the predetermined register, and this enables the VMM to detect drawing completion. Then the image processing apparatus executes the updated-portion detection process of the image information in response to the detection of the drawing completion.

Conventional VMMs perform a virtualization process using software. However, it is considered that load on virtualization can be reduced by support for virtualization by a processor and a chipset being hardware. Processors provided with virtualization support functions such as Intel Virtualization Technology (Intel VT) or Advanced Micro Devices Secure Virtual Machine (AMD SVM) begin to be provided. The first embodiment assumes that the processor provided with hardware virtualization support functions is used.

An overview of the processor provided with the hardware virtualization support functions will be explained below.

Provided in the processor is a "guest mode" as a new operating mode which allows a single processor to simultaneously execute a plurality of OSs. A guest OS runs in the guest mode. Provided also in the processor is a virtualization specific instruction set. For example, the processor executes a VM Entry instruction upon entering the guest mode, and executes a VM Exit instruction upon exiting the guest mode. The processor exits the guest mode, and the mode thereby shifts to a mode called "host mode" in which the VMM runs.

The VM Entry is executed when the guest OS is started. Meanwhile, the VM Exit is executed when a condition to return the process from the guest OS to the VMM occurs, such as when a privileged instruction is issued by the guest OS or when an interrupt from an input/output (I/O) occurs.

A guest-OS control structure, called Virtual Machine Control Structure (VMCS) for Intel VT or called Virtual Machine Control Block (VMCB) for AMD SVM, is used to control the guest OS. Described in the guest-OS control structure is, for example, the condition to return the process from the guest OS to the VMM.

An overview of the video driver used in the first embodiment will be explained below. A video driver supporting DirectFB is used as the video driver of the guest OS in the first embodiment. The video driver of the DirectFB includes a "FlipRegion" function to switch between the buffers upon drawing completion when the graphic card supports multi-buffering (explained later).

More specifically, the FlipRegion function is issued when the graphic card supports the multi-buffering. When an emulator unit 141 (explained later) that emulates the graphic card supports the multi-buffering in the virtual machine environment, the FlipRegion function is executed. When the FlipRegion function is executed, a register to specify an address (display start address) of a display buffer (explained later) is accessed.

In the first embodiment, by setting the guest-OS control structure so that the processor moves the process to the VMM if an access is made to the register, the updated-portion detection process of image information is executed in response to drawing completion. With this operation, the updated portion can be detected at timing of completing the drawing and a latest image can be output, which enables to prevent an image in the middle of drawing, or an incomplete image, from being output. Further, there is no need to modify the video driver itself of the DirectFB, and thus general versatility can be increased.

The details of the multi-buffering are explained below. The multi-buffering is a method of drawing image information using a plurality of buffers (a display buffer and a drawing buffer) different from the single buffering using only one frame buffer. It is noted that the display start address indicates an initial address of the display buffer.

In the single buffering, because the drawing buffer is not discriminated from the display buffer, the process of drawing appears on the display screen, and this may cause the screen to flicker. As shown in FIG. 1, the process of drawing may be visible on the screen in the case of the single buffering.

To prevent the flicker in the screen, a technique called multi-buffering, such as double buffering using two buffers and triple buffering using three buffers, is used.

In the multi-buffering, the image information is not directly drawn into the display buffer, but after the drawing of the entire image information into the drawing buffer is completed, the image information is transferred to the display buffer. The multi-buffering includes a method of fixing the display buffer and copying the drawing from the drawing buffer in which the drawing is completed to the display buffer, and a method of switching between pointers of the display buffer and the drawing buffer upon drawing completion. In the triple buffering, one of the three buffers is used as the display buffer and the rest of them are used as the drawing buffers.

Figure 2:
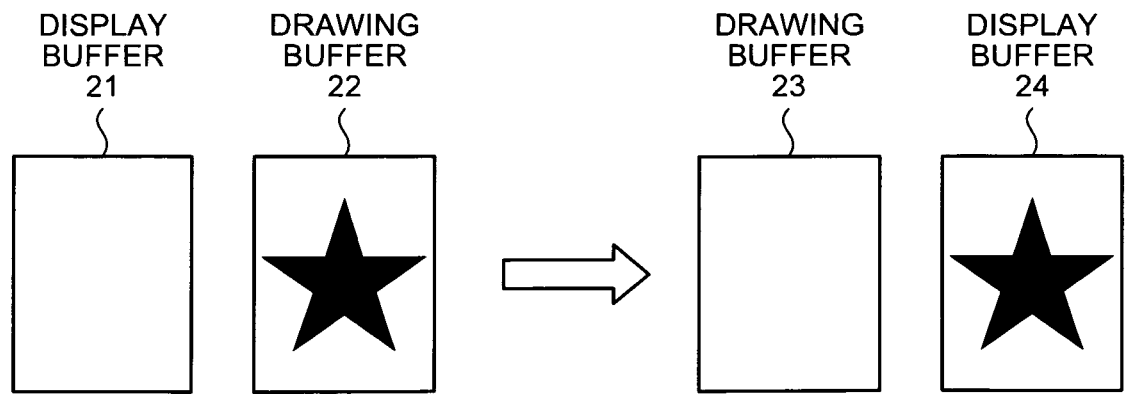
FIG. 2 is a schematic of an overview of double buffering based on a method of switching a pointer.

As shown in FIG. 2, image information is not drawn into a display buffer 21 until the drawing to a drawing buffer 22 is completed. When the drawing to the drawing buffer 22 is completed, by switching between the pointers, the drawing buffer 22 is changed to a new display buffer 24 and the display buffer 21 is changed to a new drawing buffer 23. Consequently, the image information in which the drawing is completed can always be displayed on the screen.

Figure 3:
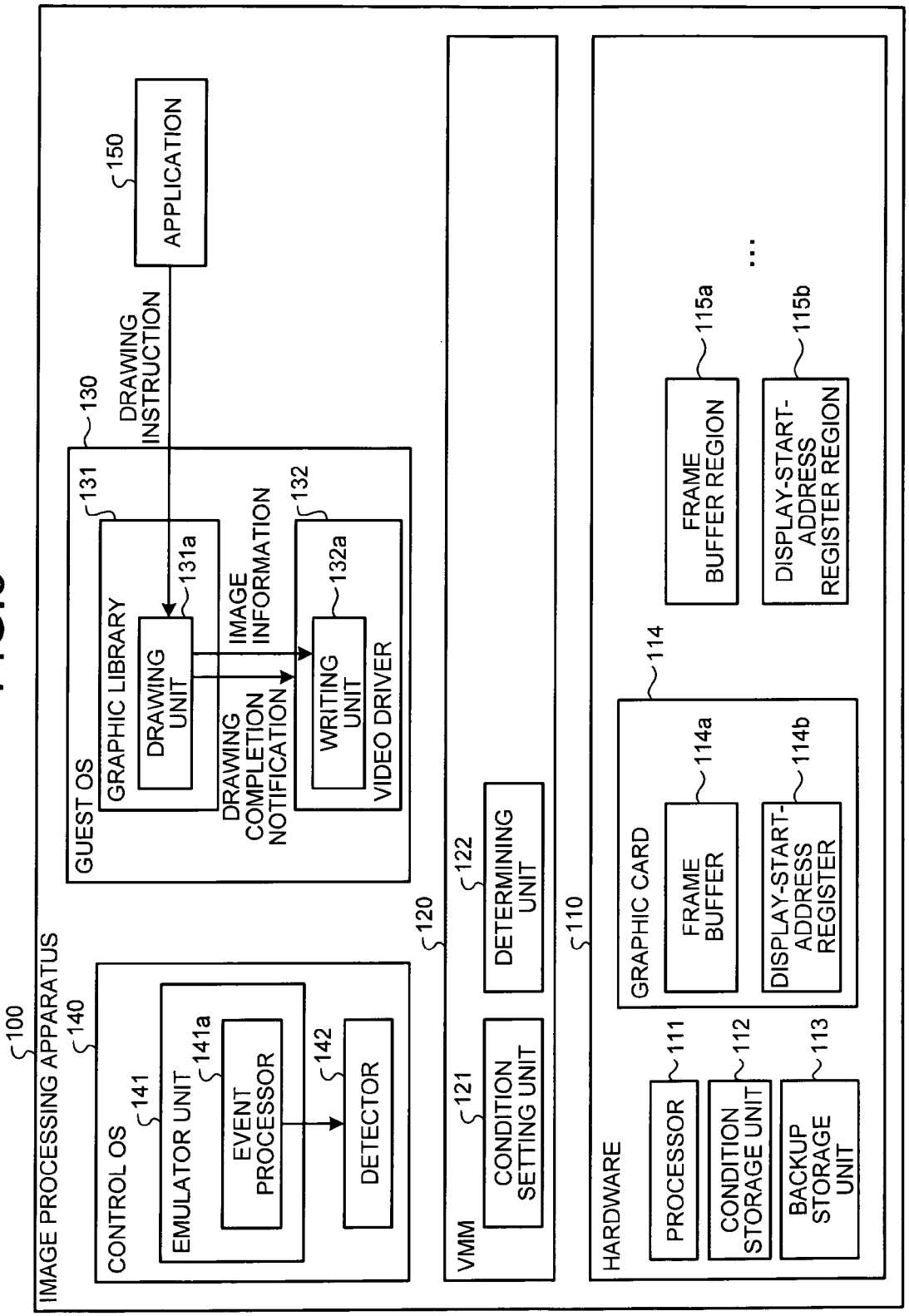
FIG. 3 is a block diagram of an image processing apparatus according to a first embodiment of the present invention.

As shown in FIG. 3, an image processing apparatus 100 includes a hardware 110, and also includes a VMM 120, a guest OS 130, a control OS 140, and an application 150 being a software configuration that functions using the hardware 110. Although only one guest OS 130 is shown in FIG. 3, a plurality of guest OSs 130 can be executed on the VMM 120. In this case, a frame buffer area, a display-start-address register area, a backup storage unit, an emulator unit, a detector, and a guest-OS control structure stored in a condition storage unit, explained later, are provided for each guest OS.

The overview of the virtualization technology is explained first with respect to FIG. 3. As explained above, the guest OSs 130 run on the VMM 120 in the virtual machine environment. The VMM 120 arbitrates accesses of the guest OSs 130 to a shared hardware resource.

The guest OS 130 operates the virtual machine environment. The control OS 140 is permitted to control the guest OSs 130, and performs processes of starting the guest OS 130 and accessing the shared hardware resource instead of the guest OS 130.

The application 150 is a program that runs on the guest OS 130 and provides various processes. One guest OS 130 and the application 150 that runs on the guest OS 130 allow implementation of one virtual machine environment.

The components will be explained in detail below.

The hardware 110 includes a processor 111, a condition storage unit 112, a backup storage unit 113, a graphic card 114, a frame buffer area 115a, and a display-start-address register area 115b. The hardware 110 may include a hardware resource such as a read only memory (ROM) and a communication interface (I/F) although they are omitted in FIG. 3.

The processor 111 includes hardware virtualization support functions such as Intel VT or AMD SVM. The condition storage unit 112 stores therein a guest-OS control structure that contains a condition to return the process from the guest OS 130 to the VMM 120.

A specific method of setting the guest-OS control structure stored in the condition storage unit 112 is explained below. In the first embodiment, by setting the guest-OS control structure in the following manner, an access to a register via memory mapped input-output (MMIO) is detected.

First, an example of setting the VMCS of Intel VT is explained below. In this case, "Primary Processor-Based VM-Execution Controls" and "I/O-Bitmap" being VM-Exit control fields in the VMCS are used, and "Exit Reason" and "Exit Qualification" being VM-Exit information fields therein are used.

More specifically, "Use I/O-bitmaps" at a 25th bit of "Primary Processor-Based VM-Execution Controls" is set to "1". Then, a bit, of "I/O-Bitmap", corresponding to an I/O port number is set to "1", the I/O port number corresponding to a register to which an access is to be detected.

Accordingly, a VM Exit occurs when the register to be detected is accessed. In this example, in the VM-Exit information field, bits 0 to 15 (cause of VM Exit) of "Exit Reason" become 30, and bits 16 to 31 (port number) of "Exit Qualification" become corresponding port number. By referring to these information, the VMM 120 can determine that the VM Exit has occurred caused by the access to the register to be detected.

Next, an example of setting the VMCB of AMD SVM is explained below. In this case, "I/O Permission Map", "Exception Bitmap", "EXITCODE", and "EXITINFO1" being a control area of the VMCB are used.

More specifically, a bit, of "I/O Permission Map" at byte offset "040h" ("h" represents hexadecimal) of the VMCB, corresponding to an I/O port number is set to "1", the I/O port number corresponding to a register to which an access is detected.

Accordingly, a VM Exit occurs when the register to be detected is accessed. In this example, "EXITCODE" becomes "7Bh", and bits 16 to 31 of "EXITINFO1" become corresponding port number. By referring to these information, the VMM 120 can determine that the VM Exit has occurred caused by the access to the register to be detected.

The backup storage unit 113 can store therein backup data of entire image information stored in a frame buffer 114a (explained later).

The graphic card 114 is an expansion card provided with a function for image drawing, and includes the frame buffer 114a and a display-start-address register 114b.

The frame buffer 114a is a storage unit that stores therein image-information for one screen corresponding to the screen of the guest OS 130. The display-start-address register 114b stores therein display start addresses.

The condition storage unit 112, the backup storage unit 113, the frame buffer area 115a, and the display-start-address register area 115b can be formed by any generally used storage medium such as a random access memory (RAM), a hard disk drive (HDD), an optical disk, and a memory card. The frame buffer area 115a is allocated for each of the guest OSs 130 as an area corresponding to the frame buffer 114a. The display-start-address register area 115b is allocated for each of the guest OSs 130 as an area corresponding to the display-start-address register 114b.

The VMM 120 includes a condition setting unit 121 and a determining unit 122.

The condition setting unit 121 previously sets a condition in a guest-OS control structure so that the process moves to the VMM 120 when the drawing of the image information is completed. As explained above, in the video driver of the DirectFB, the display-start-address register 114b is accessed when the FlipRegion function is called upon drawing completion. The condition setting unit 121, therefore, sets the guest-OS control structure so that a VM Exit occurs when the display-start-address register 114b is accessed. Consequently, the process can be moved to the VMM 120 upon completion of a screen update.

The determining unit 122 determines the cause of movement of the process when the process has moved to the VMM 120 due to the VM Exit. For example, when the processor 111 supports Intel VT, the determining unit 122 determines the cause by referring to "Exit Reason" being the VM-Exit information field in the guest-OS control structure (VMCS). Alternatively, when the processor 111 supports AMD SVM, the determining unit 122 also determines the cause by referring to "EXITCODE" and "EXITINFO1" being the control area in the guest-OS control structure (VMCB).

The VMM 120 executes various processes according to the determined cause. For example, when it is determined that the cause is the access to the display-start-address register 114b, the VMM 120 notifies an event processor 141a (explained later) in the emulator unit 141 of the access to the display-start-address register 114b.

The guest OS 130 includes a graphic library 131 and a video driver 132, which are functions for image display. It is noted that the guest OS 130 has all functions required to operate a virtual machine environment in addition to the functions for image display.

The graphic library 131 includes a drawing unit 131a.

The drawing unit 131a outputs image information being results of various image processes performed according to the drawing instruction specified by the application 150. For example, when receiving a drawing instruction to enlarge or reduce an area, the drawing unit 131a specifies an area to be enlarged or reduced from coordinate information or the like contained in the drawing instruction, and outputs image information containing the coordinate information for the area as a result of enlarging or reducing the area. The coordinate information is represented by a coordinate system in which when a screen is formed of, for example, 1024×768 pixels, the upper left of the screen is set to (0, 0) and the lower right thereof is set to (1023, 767). The drawing unit 131a converts the coordinate information of the image information to a virtual address of the frame buffer 114a, and transfers the virtual address to a writing unit 132a (explained later). Further, the drawing unit 131a notifies the writing unit 132a of drawing completion when the drawing of the image information is completed.

The video driver 132 corresponds to the DirectFB as explained above, and includes the writing unit 132*a*. An applicable driver is not limited to a DirectFB-compatible driver, and thus, any type of driver can be used as the video driver 132 if the driver is configured so as to execute a specific function and instruction upon drawing completion which accesses a specific register.

The writing unit 132*a* writes image information, for, which writing is requested, to a physical memory area corresponding to the virtual address specified by the drawing unit 131*a*.

Further, the writing unit 132*a* executes the FlipRegion function when detecting, by the notification sent from the drawing unit 131*a*, that the drawing of the image information is completed. It is noted that when the emulator unit 141 supports the multi-buffering, the writing unit 132*a* executes the FlipRegion function upon drawing completion. Therefore, the writing unit 132*a* needs to be previously notified from the emulator unit 141 that the emulator unit 141 supports the multi-buffering.

The control OS 140 includes the emulator unit 141 and a detector 142.

The emulator unit 141 provides emulation of the graphic card that supports the multi-buffering, to the guest OS 130. In other words, the emulator unit 141 notifies the guest OS 130 that the emulator unit 141 supports the multi-buffering. This allows the writing unit 132*a* in the video driver 132 of the guest OS 130 to issue the FlipRegion function upon drawing completion.

When the multi-buffering is to be emulated, the emulator unit 141 may actually use a plurality of buffers to perform a usual multi-buffering process, or may actually use only one buffer to emulate the multi-buffering. In both of the cases, the writing unit 132*a* sequentially executes processes for (1) drawing of image information, (2) update notification (FlipRegion function), (3) waiting for completion of buffer switching, and (4) drawing of next image information. When only one buffer is used, drawing of the next image information has to be waited until an updated image for the display buffer is generated, and thus the emulator unit 141 executes emulation so as to look as if the buffer switching was completed when the generation of the updated image is completed.

The emulator unit 141 further includes the event processor 141*a*.

When it is notified from the VMM 120 that the display-start-address register 114*b* is accessed, the event processor 141*a* determines that an event of screen update has occurred, and notifies the detector 142 of occurrence of the event to start a updated-portion detection process.

When the screen is updated, the detector 142 compares the image information in the backup storage unit 113 with the latest image information in the frame buffer 114*a*, to detect a rectangle containing a different point as the updated portion.

Next, the image process performed by the image processing apparatus 100 according to the first embodiment configured in the above manner will be explained below. The image process is divided into an image writing process of writing image information to the frame buffer 114*a* and to the backup storage unit 113, and an updated-portion detection process of comparing the backed-up image information with the latest image information and detecting an updated portion of the image information.

Figure 4:
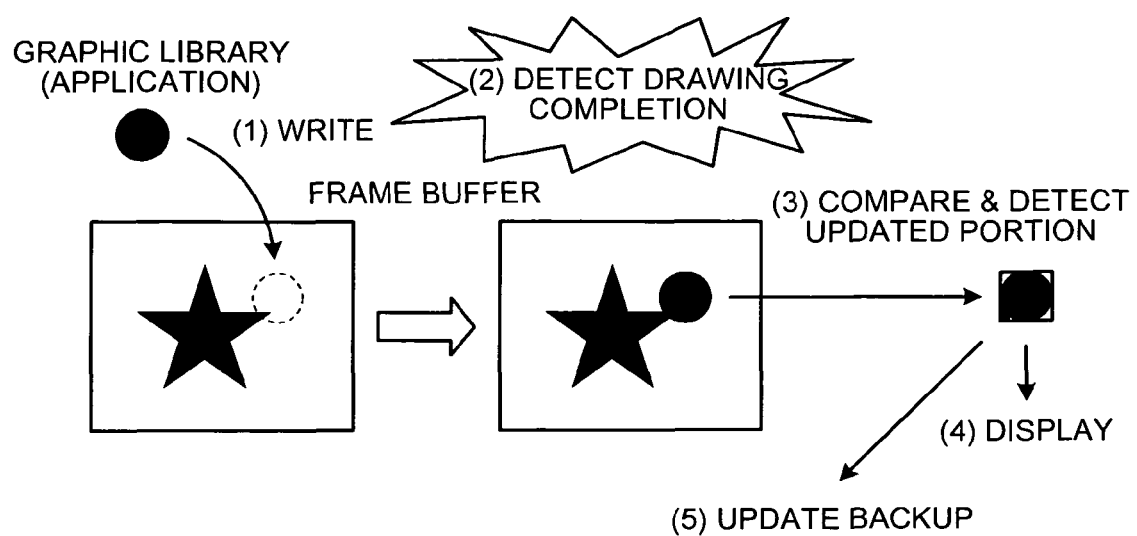
FIG. 4 is a schematic of an overview of an image writing process and an updated-portion detection process.

An overview of the image writing process and the updated-portion detection process is explained first with reference to FIG. 4.

In the image writing process, first, entire backup of the frame buffer 114*a* is previously stored in the backup storage unit 113. If it is possible to detect whether the frame buffer 114*a* is in an initial state using pixel values of the frame buffer 114*a*, storage of the backup at this time point may be omitted. For example, if all the pixels in the initial state are black, it can be determined that the frame buffer 114*a* is in the initial state in which no backup exists, and thus, the storage of the backup can be omitted.

At this state, the application 150 sends a drawing instruction to the frame buffer 114*a* via the graphic library 131 for screen display (1). When detecting completion of the drawing to the frame buffer 114*a*, the detector 142 starts the updated-portion detection process (2). The detector 142 compares the backed-up image information with the latest image information in the frame buffer 114*a*, to detect a rectangle as the updated portion (3).

The image information of the detected updated portion is displayed as the screen of the guest OS 130 (4). The image information in the backup storage unit 113 is updated to image information the same as the latest image information in the frame buffer 114*a* (5).

The image processing apparatus 100 may also be configured so that it is used as a virtual machine server, the screen of the guest OS 130 is transmitted to a terminal device connected thereto via a network, and the screen is displayed on the terminal device. In this case, instead of the process of displaying the image information for the updated portion in the process (4), the image information for the updated portion is transmitted to the terminal device.

Figure 5:
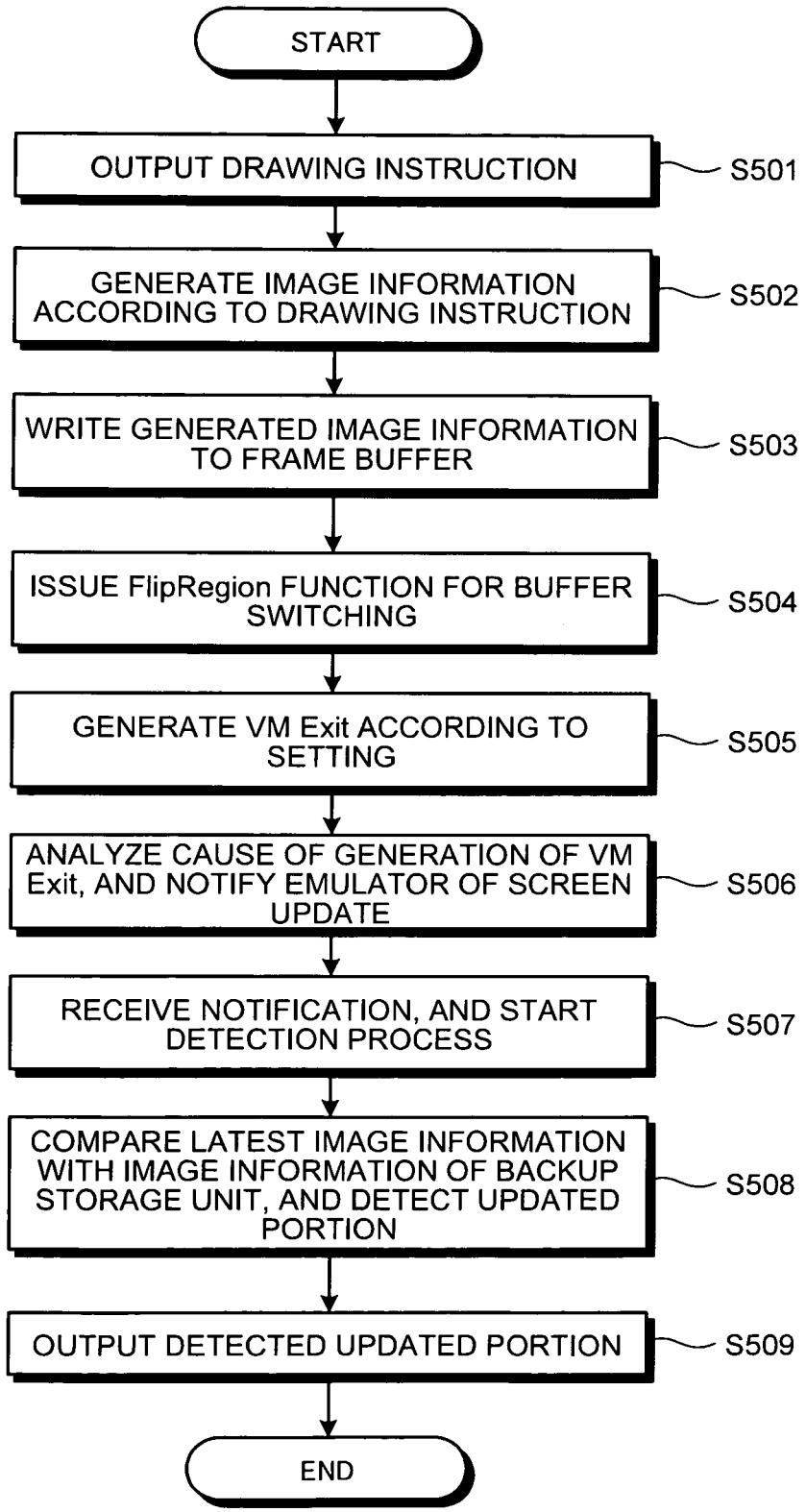
FIG. 5 is a flowchart of the updated-portion detection process.

A detailed flow of the updated-portion detection process will be explained below with reference to FIG. 5.

The condition setting unit 121 is assumed to set the guest-OS control structure so that a VM Exit occurs when the display-start-address register 114*b* is accessed. The writing unit 132*a* is assumed to be notified from the emulator unit 141 that the emulator unit 141 supports the multi-buffering.

At this state, first, when an event of updating screen information for the executed process occurs, the application 150 outputs a drawing instruction to require drawing of the display screen (Step S501). Then, the drawing unit 131*a* performs the image process according to the drawing instruction, to generate resulting image information (Step S502). Next, the writing unit 132*a* writes the required image information to a specified location of the frame buffer 114*a* (Step S503). When the drawing to the frame buffer 114*a* is completed, the writing unit 132*a* executes the FlipRegion function to switch the buffer for the multi-buffering (Step S504). Then, the display-start-address register 114*b* is accessed due to the function.

When the display-start-address register 114*b* is accessed, the processor 111 generates a VM Exit according to the setting of the guest-OS control structure (Step S505). Consequently, the process moves from the guest OS 130 to the VMM 120. The determining unit 122 of the VMM 120 determines the cause of generation of the VM Exit by referring to the VM-Exit information field in the guest-OS control structure. When it is determined that the cause is screen update, the determining unit 122 notifies the emulator unit 141 of the screen update (Step S506).

When receiving the notification, the event processor 141*a* instructs the detector 142 to start a detection process (Step S507). The detector 142 compares the latest image information written to the frame buffer 114*a* with the image information stored in the backup storage unit 113, and detects a different portion as the updated portion (Step S508).

The detector 142 outputs the detected updated portion (Step S509), and ends the updated-portion detection process.

As explained above, in the image processing apparatus according to the first embodiment, the processor is set so that the control moves to the VMM when the display-start-address register 114*b* for use in the multi-buffering is accessed, and this allows detection of drawing completion by the VMM, so that the updated-portion detection process of the image information can be executed in response to the detection of the drawing completion.

This eliminates the possibility to display the incomplete image, so that appearance of the display image is better. Besides, the drawing completion can be hooked by the VMM only by changing the setting of the processor, and thus, there is no need to modify the graphic library and the video driver according to the virtual environment. Namely, the functions can be implemented by using standard graphic library and video driver.

The example in which the VMM is directly executed on hardware is explained so far. However, the same functions as these of the first embodiment can be implemented even if the VMM is indirectly executed on the hardware. The indirect execution indicates that a host OS being the base of operation runs on the hardware and further the VMM runs on the host OS.

Figure 6:
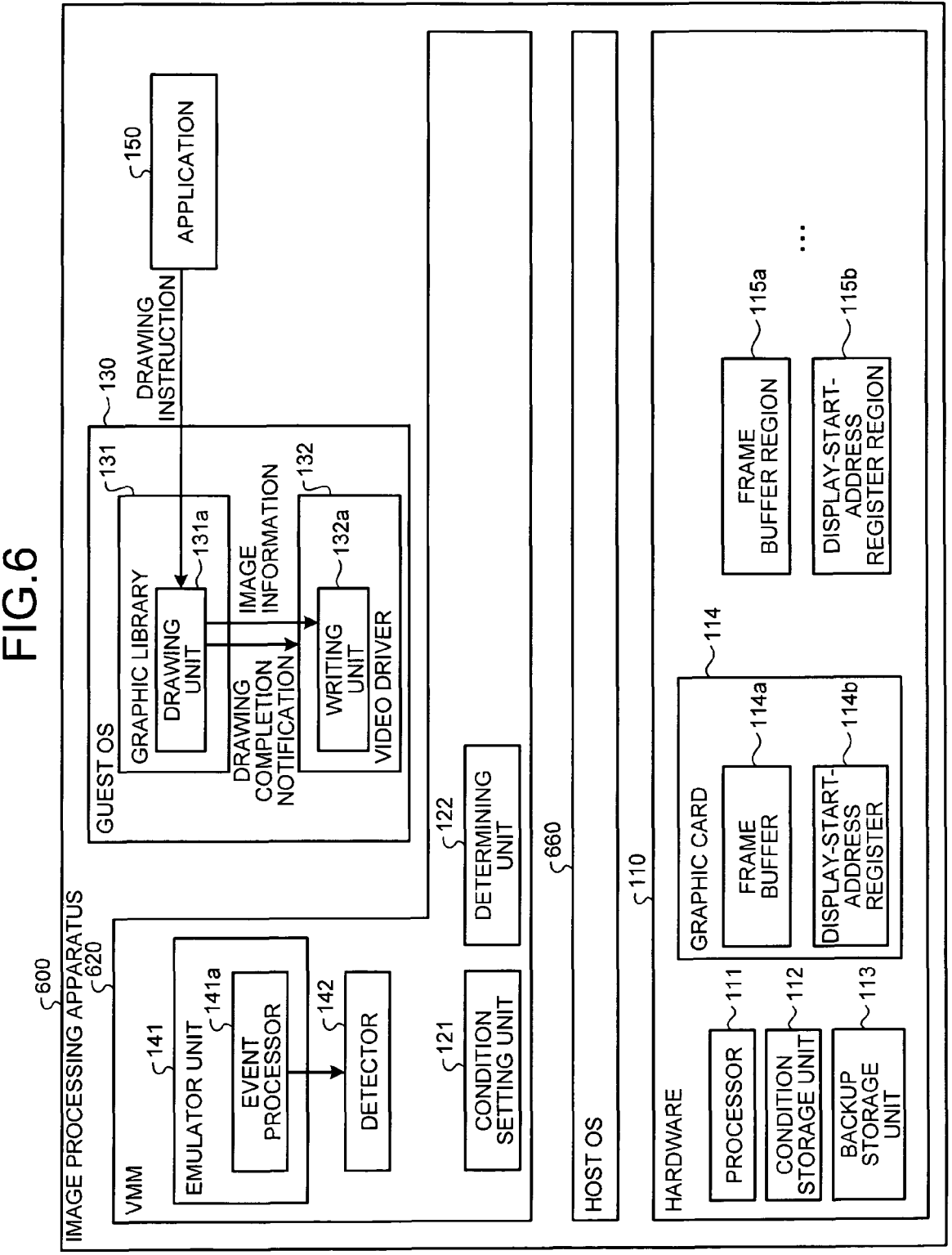
FIG. 6 is a block diagram of an image processing apparatus according to a modification of the first embodiment.

As shown in FIG. 6, an image processing apparatus 600 includes a host OS 660, a VMM 620, the guest OS 130, and the application 150, being a software configuration that functions using the hardware 110.

A modification of the first embodiment as shown in FIG. 6 is different from FIG. 3 representing the block diagram according to the first embodiment in points that the host OS 660 is added, the control OS 140 is removed, and the emulator unit 141 and the detector 142 being the components of the control OS 140 are included in the VMM 620. The rest of the components and functions are the same as these of FIG. 3, and thus the same reference numerals are assigned to these and explanation thereof is omitted. Furthermore, the image writing process and the updated-portion detection process are the same as these of FIGS. 4 and 5, and thus explanation thereof is also omitted.

In the first embodiment, the screen update is detected by using the function such that the display-start-address register is accessed upon notification of drawing completion and by hooking the access to the display-start-address register by the VMM.

However, there is a case where the access is not made to a predetermined register upon drawing completion depending on types of the video driver. On the other hand, there exists a video driver that issues a basic input-output system (BIOS) call when the drawing completion is to be notified, like a video driver of the Video Electronics Standards Association (VESA). Therefore, in a second embodiment, an example of providing a video driver that issues a predetermined BIOS call upon drawing completion is explained. The second embodiment is configured to set the processor so that the control moves to the VMM when the predetermined BIOS call is issued, and this enables the drawing completion to be detected by the VMM, so that the updated-portion detection process of the image information is executed in response to the detection of the drawing completion.

An overview of the video driver used in the second embodiment will be explained first. A video driver of the VESA is used as the video driver of the guest OS in the second embodiment. When the graphic card supports the multi-buffering, the video driver of the VESA executes a "Set Display Start" BIOS call for buffer switching upon drawing completion.

A method of hooking the BIOS call by the VMM is different depending on an operating mode of the processor. The operating mode of the processor in this case is an operating mode that contains a real mode and a protect mode, being different from the operating mode that has the guest mode and the host mode.

The real mode is an operating mode assuming that an accessible memory area is from 0 megabyte to 1 megabyte and the number of programs which can be executed at a time is one. Meanwhile, the protect mode is an operating mode to which functions of enlarging an accessible memory area, a multi-task support, and of data security are added.

The processor is always started in the real mode upon turning on the power supply, and thereafter, the real mode shifts to the protect mode using the software. The processor generally operates in the protect mode except for right after turning on of the power supply for the computer.

When the processor is operating in the real mode, an INT 10h software interrupt occurs upon issuance of the BIOS call. The INT 10h software interrupt is, therefore, hooked, and this allows a VM Exit to occur.

On the other hand, when the processor is operating in the protect mode, an interrupt, an access to a register, and an exception, which can be hooked by the VMM, do not occur. In this case, therefore, an address of a corresponding BIOS call is set as a breakpoint in the debug register of the processor. This allows generation of a debug exception when the corresponding BIOS call is issued. The generation of the debug exception is hooked, to allow a VM Exit to occur.

More specifically, in the second embodiment, the guest-OS control structure is set so that the VM Exit will occur if the INT 10h software interrupt or the debug exception occurs caused by issuing the predetermined BIOS call. This allows the process to move to the VMM upon completion of the screen update when the processor is operating in either one of operating modes, the real mode and the protect mode.

Figure 7:
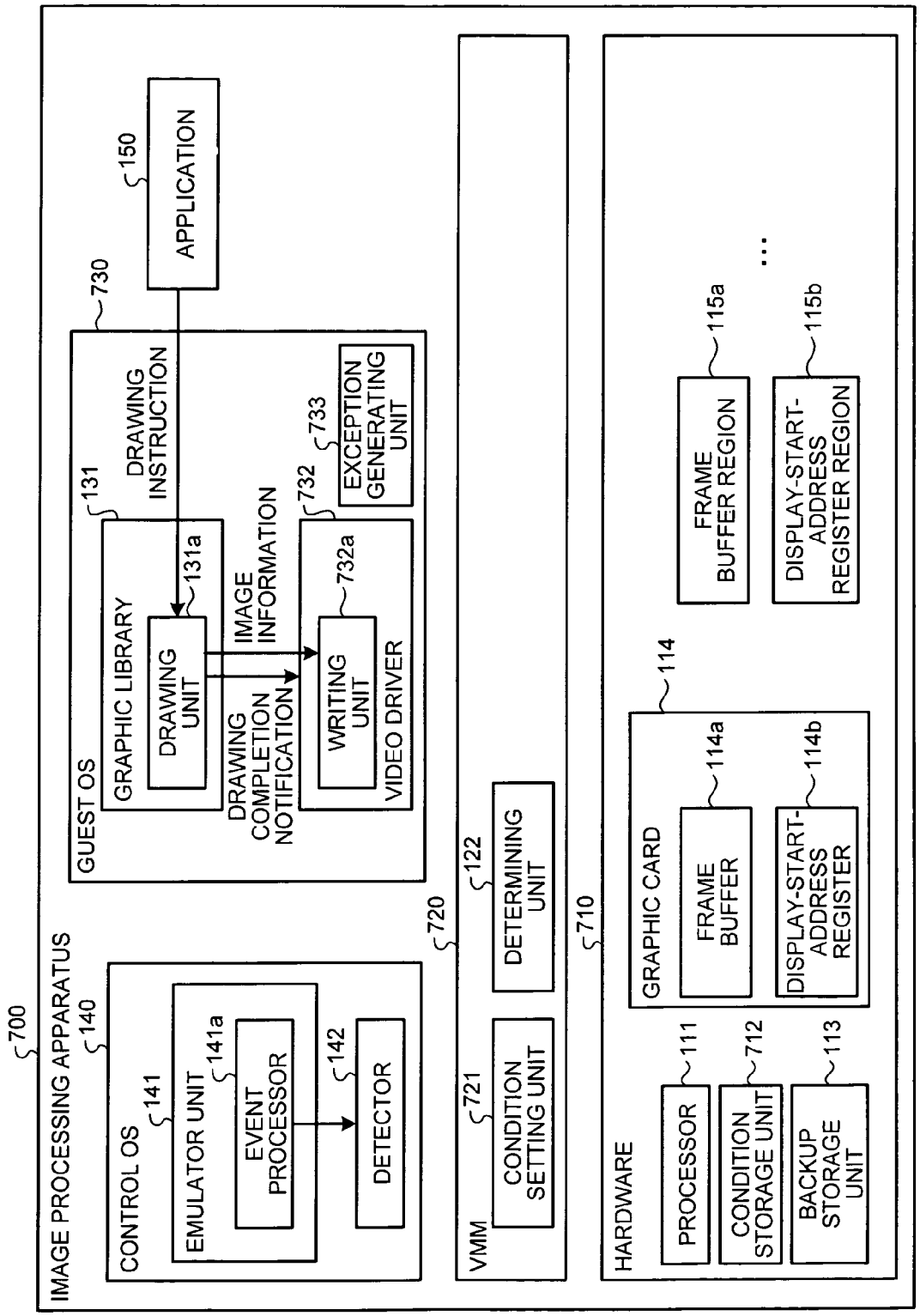
FIG. 7 is a block diagram of an image processing apparatus according to a second embodiment of the present invention.

The functions and the configuration of the image processing apparatus according to the second embodiment will be explained next. As shown in FIG. 7, an image processing apparatus 700 includes a hardware 710, and also includes a VMM 720, a guest OS 730, the control OS 140, and the application 150 which represent a software configuration that functions using the hardware 710.

The second embodiment is different from the first embodiment in such points as the content of the guest-OS control structure that is stored in a condition storage unit 712 in the hardware 710, the function of a condition setting unit 721 in the VMM 720, and as the function of the guest OS 730. The rest of the components and functions are the same as these of FIG. 3, and thus, the same reference numerals are assigned to these, so that explanation thereof is omitted.

The condition storage unit 712 stores therein the guest-OS control structure that contains the condition to return the process from the guest OS 730 to the VMM 720 in response to the interrupt or the exception occurring caused by a predetermined BIOS call.

A specific method of setting the guest-OS control structure stored in the condition storage unit 712 will be explained below. In the second embodiment, by setting the guest-OS control structure in the following manner, the INT 10h software interrupt and a debug exception are detected.

An example of setting the VMCS of Intel VT is explained first. In this case, "Exception Bitmap" being the VM-Exit control field in the VMCS is used, and "Exit Reason", "Exit Qualification", and "IDT-Vectoring Information" being the VM-Exit information fields therein are also used.

When the INT 10h software interrupt is to be detected, first, a 10th bit of Software Interrupt Redirection Bitmap in Task State Segment (TSS) provided in the processor 111 is set to "1". Then, a bit, of "Exception Bitmap", corresponding to a general protection exception is set to "1". When a general protection exception or a task switch occurs due to the INT 10h software interrupt, a VM Exit occurs.

When the general protection exception occurs, in the VM-Exit information field, bits 0 to 15 of "Exit Reason" are cleared to 0, bits 0 to 7 (interrupt vector) of "IDT-Vectoring Information" become 10, and bits 8 to 10 (interrupt type) of "IDT-Vectoring Information" become 4. When the task switch occurs, in the VM-Exit information field, bits 0 to 15 of "Exit Reason" become 9, bits 30 to 31 (cause of occurrence of task switch) of "Exit Qualification" become 3, bits 0 to 7 of "IDT-Vectoring Information" become 10, and bits 8 to 10 of "IDT-Vectoring Information" become 4.

By referring to these information, the VMM 720 can determine that the VM Exit has occurred caused by the INT 10h software interrupt.

When the debug exception is to be detected, a bit, of "Exception Bitmap", corresponding to the debug exception is set to "1". Accordingly, when the debug exception occurs, a VM Exit occurs. When the VM Exit occurs caused by the debug exception, in the VM-Exit information field, bits 0 to 15 of "Exit Reason" are cleared to 0, and bits 0 to 3 (B0 to B3 flags) of "Exit Qualification" become breakpoint numbers.

By referring to these information, the VMM 720 can determine that the VM Exit has occurred caused by the debug exception.

An example of setting the VMCB of AMD SVM will be explained next. In this case, "Exception Bitmap", "EXITCODE", and "EXITINFO1" being the control area in the VMCB are used.

A method of detecting the INT 10h software interrupt includes a method of causing a VM Exit for all software interrupts as targets, and a method of causing a VM Exit only for the INT 10h software interrupt as a target.

In the first case, a 21st bit at byte offset "00Ch" of the VMCB is set to "1". Accordingly, a VM Exit occurs in response to occurrence of a software interrupt, and "EXITCODE" becomes "75h" and bits 0 to 7 of "EXITINFO1" become 10.

In the second case, a 0th bit of CR 4 (Control Register 4) provided in the processor 111 is set to "1", a 10th bit of the Software Interrupt Redirection Bitmap in the TSS is set to "1", and a 13th bit, of "Exception Bitmap" at byte offset "008h" of the VMCB, corresponding to the general protection exception is set to "1". Accordingly, a VM Exit occurs in response to occurrence of the INT 10h software interrupt, and "EXITCODE" becomes "53h".

By referring to these information, the VMM 720 can determine that the VM Exit has occurred caused by the INT 10h software interrupt.

When the debug exception is to be detected, a 1st bit, of "Exception Bitmap" at byte offset "008h" of the VMCB, corresponding to the debug exception is set to "1". Accordingly, a VM Exit occurs in response to occurrence of the debug exception, and "EXITCODE" becomes "41h".

By referring to these information, the VMM 720 can determine that the VM Exit has occurred caused by the debug exception.

The condition setting unit 721 previously sets a condition in the guest-OS control structure according to the setting method so that the process moves to the VMM 720 upon completion of the drawing of image information. Further, the condition setting unit 721 checks an address of a BIOS call issued upon drawing completion, and executes a breakpoint setting process of setting the address as a breakpoint in the debug register. Details of the breakpoint setting process are explained later.

The guest OS 730 further includes an exception generating unit 733 in addition to the graphic library 131 and a video driver 732.

The video driver 732 is a driver supporting the VESA as explained above, and includes a writing unit 732a. The writing unit 732a is different from the writing unit 132a according to the first embodiment in a point that the Set Display Start BIOS call is executed to switch to the display buffer upon drawing completion of image information.

An applicable driver is not limited to a driver that supports VESA, but any type of driver can be used if the driver executes a specific BIOS call upon drawing completion.

The exception generating unit 733 generates a debug exception when a memory area indicated by a virtual address set in the debug register is accessed. In the second embodiment, because the address of the Set Display Start BIOS call is set in the debug register, the exception generating unit 733 generates a debug exception in response to the execution of the BIOS call.

Figure 8:
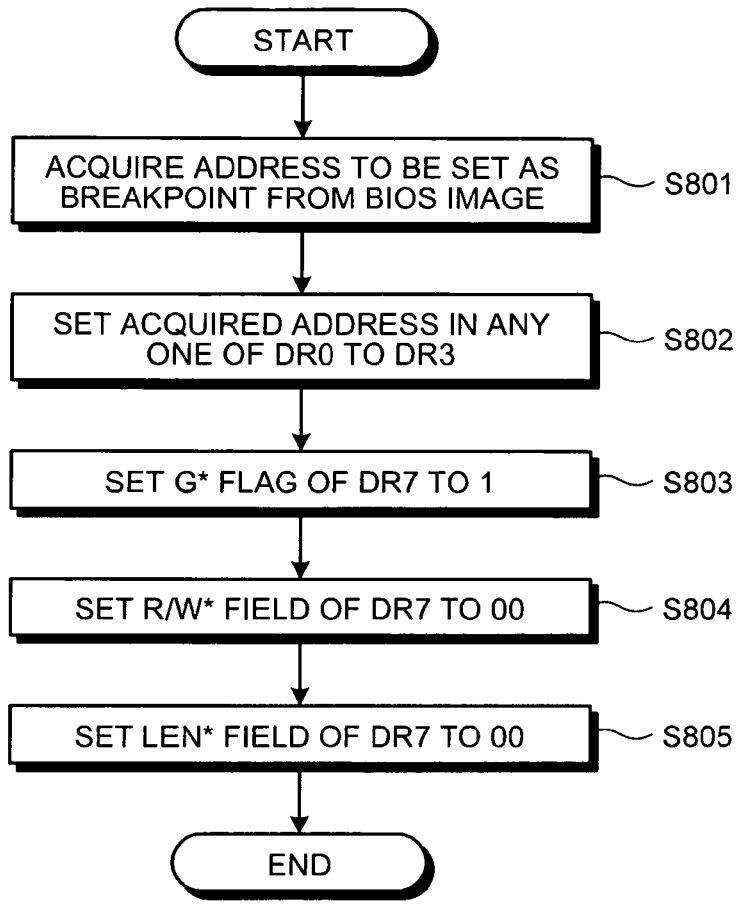
FIG. 8 is a flowchart of a breakpoint setting process according to the second embodiment.

An address of the Set Display Start BIOS call can be acquired in the following manner and set in the debug register. FIG. 8 is a flowchart of the breakpoint setting process according to the second embodiment. The breakpoint setting process is used to interrupt a program when the program reaches a specified address. In the second embodiment, when the program reaches the address of the Set Display Start BIOS call, the program is interrupted, and the process moves to the VMM 720.

First, to check an address to be set as a breakpoint, the condition setting unit 721 finds out Protected Mode Information Block structure that exists in initial 32 kilobits of a BIOS image. The condition setting unit 721 can acquire the address of the Set Display Start BIOS call in the protect mode from the structure (Step S801). The BIOS image is stored in a nonvolatile memory (not shown) or the like.

The condition setting unit 721 acquires the address of the Set Display Start BIOS call and then sets the acquired address as a breakpoint in the debug register.

A configuration example of the debug registers will be explained below with reference to FIGS. 9 to 11. The debug registers include eight debug registers DR0 to DR7. The debug registers DR4 and DR5 out of them are not used because of reserved ones, and thus explanation thereof is omitted.

Figure 9:
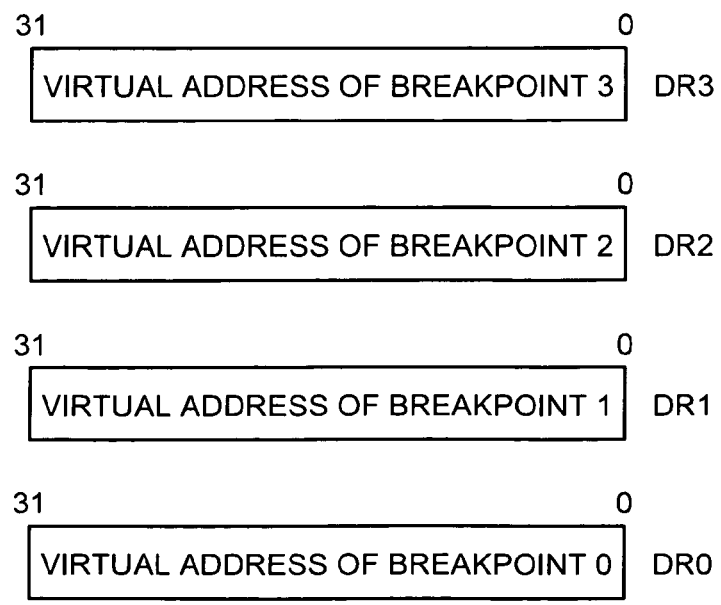
FIG. 9 is a schematic of a configuration example of debug registers.

FIG. 9 is a schematic of a configuration example of the debug registers DR0 to DR3. The debug registers DR0 to DR3 are used to set virtual addresses as breakpoints therein respectively, and are called "debug address registers".

Figure 10:
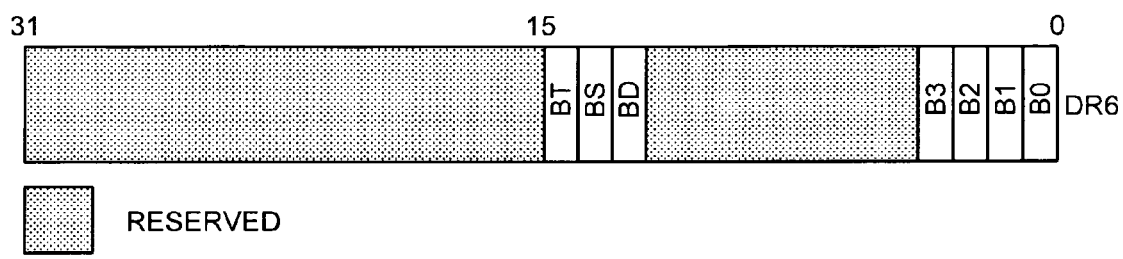
FIG. 10 is a schematic of a configuration example of another debug register.

FIG. 10 is a schematic of a configuration example of the debug register DR6. The debug register DR6 indicates a status when a debug exception occurs, and is called a "debug status register". In FIG. 10, when B0 to B3 flags are set, this status indicates that break conditions of the breakpoints set in corresponding debug address registers are satisfied and the debug exception thereby occurred.

Figure 11:
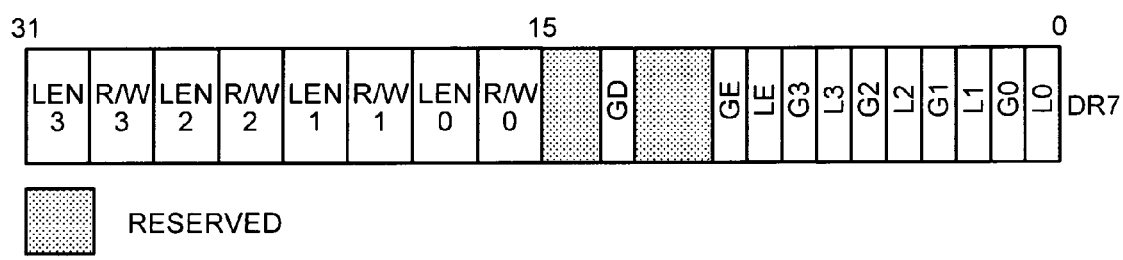
FIG. 11 is a schematic of a configuration example of another debug register.

FIG. 11 is a schematic of a configuration example of the debug register DR7. The debug register DR7 is used to set break conditions of breakpoints set in the debug address registers, and is called a "debug control register".

When L0 to L3 flags or G0 to G3 flags are set, this status indicates that the breakpoints set in corresponding debug address registers become valid. The L0 to L3 flags are set when the breakpoints set in corresponding debug address registers are valid only in a current task, while the G0 to G3 flags are set when they are valid in all tasks.

R/W0 to R/W3 fields represent break conditions of breakpoints set in corresponding debug address registers. When a break is to be occurred by executing an instruction, "00" is set. LEN0 to LEN3 fields represent each size of breakpoints set in corresponding debug address registers. When a break is to be occurred by executing an instruction, "00" is set.

When a GD flag is set, a debug exception occurs when the debug register is overwritten. By setting the flag, the breakpoint set by the condition setting unit 721 can be prevented from being overwritten by the guest OS 730.

To set the acquired address as a breakpoint in the debug register configured in the above manner, any one of DR0 to DR3 being the debug address registers and a corresponding bit of DR7 being the debug control register are set.

Referring back to FIG. 8, details of the process of setting a debug register will be explained below. The condition setting unit 721 sets the acquired address as a breakpoint in any one of DR0 to DR3 (Step S802). Here, an example of using a breakpoint 0 (DR0) is explained. In this case, the condition setting unit 721 sets the acquired address in the debug address register (DR0).

Next, the condition setting unit 721 sets the G0 flag of the debug control register (DR7) to 1 (Step S803). Then, the condition setting unit 721 sets the R/W0 field of DR7 to "00" (Step S804). Furthermore, the condition setting unit 721 sets the LEN0 field of DR7 to "00" (Step S805).

It is noted that the symbol "*" of FIG. 8 indicates that a numerical value changes depending on in which one of the debug address registers DR0 to DR3 a breakpoint is set. More specifically, when the breakpoint is set in DR1, this indicates that the G1 flag, the R/W1 field, and the LEN1 field of DR7 are set.

By setting the debug register in this manner, a debug exception occurs in response to the access to the set address. In addition, by checking the B0 flag of the debug status register (DR6), it is possible to find out that the occurrence of the debug exception is caused by the access to the breakpoint 0.

Figure 12:
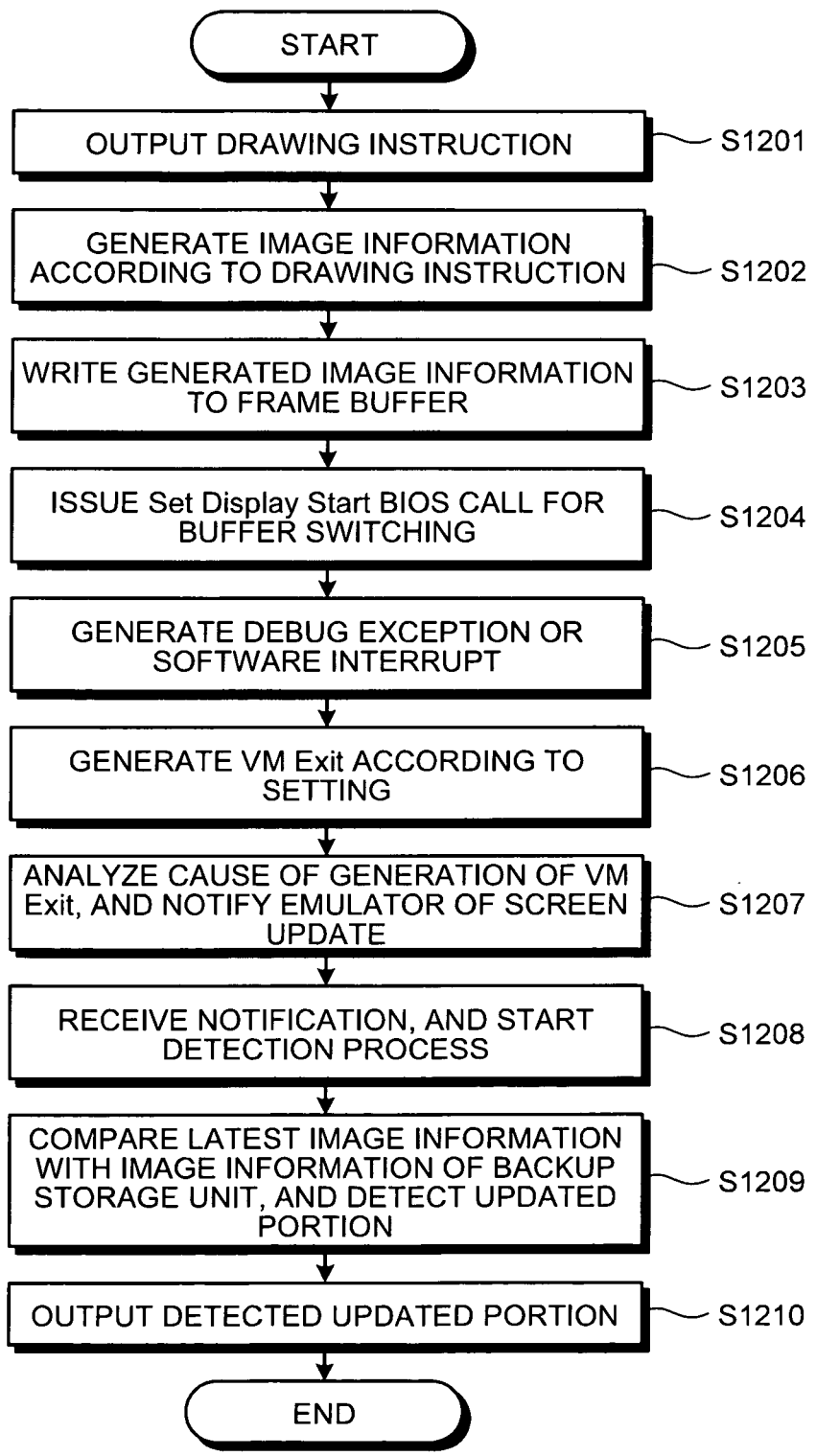
FIG. 12 is a flowchart of an updated-portion detection process according to the second embodiment.

Next, the updated-portion detection process by the image processing apparatus 700 configured in the above manner will be explained below with reference to FIG. 12. The overview of the image process is the same as that of FIG. 4 according to the first embodiment, and thus explanation thereof is omitted.

The image information writing processes from Step S1201 to Step S1203 are the same as these from Step S501 to Step S503 in the image processing apparatus 100, and thus explanation thereof is omitted.

After writing the image information, the writing unit 732a issues Set Display Start BIOS call to switch the buffer for the multi-buffering (Step S1204).

When the BIOS call is issued, the exception generating unit 733 generates a debug exception according to the setting of the debug register (Step S1205). When the processor 111 is operating in the real mode, the INT 10h software interrupt is generated instead of the debug exception.

When the debug exception or the INT 10h software interrupt occurs, the processor 111 generates a VM Exit according to the setting of the guest-OS control structure (Step S1206). This allows the process to move from the guest OS 730 to the VMM 720.

A cause determination process, a detection process, and an updated-portion output process from Step S1207 to Step S1210 are the same as these from Step S506 to Step S509 in the image processing apparatus 100, and thus explanation thereof is omitted.

As explained above, in the image processing apparatus according to the second embodiment, by setting the processor so that the control moves to the VMM upon issuance of the predetermined BIOS call, it is possible to detect drawing completion by the VMM and to execute the updated-portion detection process of the image information in response to the detection of the drawing completion.

Figure 13:
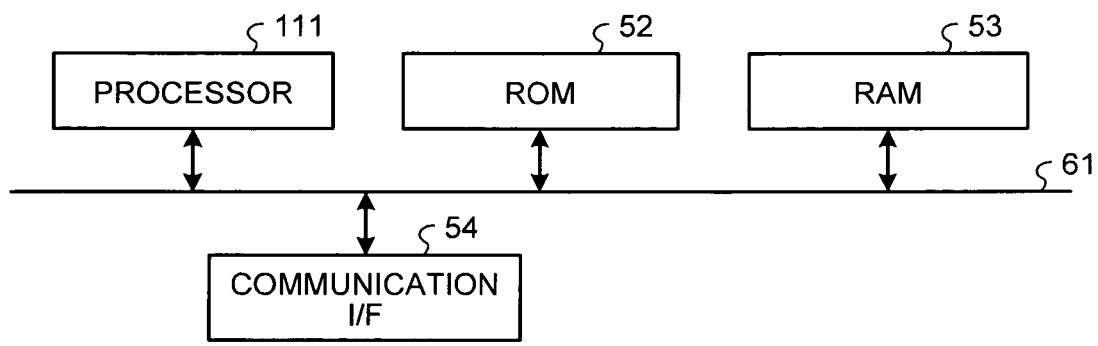
FIG. 13 is a schematic diagram for explaining a hardware configuration of the image processing apparatus according to the first or the second embodiment.

A hardware configuration of the image processing apparatus according to the first or the second embodiment will be explained below with reference to FIG. 13.

The image processing apparatus according to the first or the second embodiment includes a control device such as the processor 111, a storage device such as a read only memory (ROM) 52 and a RAM 53, a communication I/F 54 that is connected to a network to perform communications, an external storage device such as a HDD and a compact disk (CD) drive, a display unit such as a display, an input device such as a keyboard and a mouse, and a bus 61 that connects the components, which represent the hardware configuration using an ordinary computer.

An update detection program executed by the image processing apparatus according to the first or the second embodiment is provided by being recoded in a computer-readable recording medium such as compact disk read only memory (CD-ROM), flexible disk (FD), compact disk recordable (CD-R), and digital versatile disk (DVD) in an installable format or executable format.

Moreover, the update detection program executed by the image processing apparatus may be stored on a computer connected to a network such as the Internet and be provided by being downloaded through the network. Furthermore, the update detection program executed by the image processing apparatus may be provided or distributed through the network such as the Internet.

The update detection program executed by the image processing apparatus may be provided by being previously incorporated in ROM, or the like.

The update detection program executed by the image processing apparatus is formed with modules containing the components (VMM, control OS). As actual hardware, the processor 111 reads the update detection program from the recording medium and executes it, so that the components are loaded on a main storage unit to be generated on the main storage unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for detecting an update of image information, comprising:
   an image storage unit configured to store image information;
   a processor configured to transition, when a previously set transition condition is satisfied, from a first mode that causes a guest operating system to operate to a second mode that causes a virtual machine monitor managing the guest operating system to operate;
   a determining unit configured to determine, when the processor transitions to the second mode, a cause of the transition;
   a detecting unit configured to detect, when the determining unit determines that the cause of the transition is an execution of a process related to a completion of writing the image information in the image storage unit on the guest operating system, an updated portion representing an unmatched portion of the image information between before and after writing; and an emulating unit configured to emulate a multi-buffering function to switch between a first storage unit for writing the image information and a second storage unit for displaying the image information, wherein the detecting unit is configured to detect the updated portion when the determining unit determines that the cause of the transition is an access to a register by a function requesting to switch to the second storage unit upon the completion of writing the image information.

2. A method of detecting an update of image information, comprising:

determining a processor that transitions from a first mode that causes a guest operating system to operate to a second mode that causes a virtual machine monitor managing the guest operating system to operate when a previously set transition condition is satisfied and determining a cause of the transition when the processor transitions to the second mode;

detecting, when it is determined that the cause of the transition is an execution of a process related to a completion of writing the image information in an image storage unit on the guest operating system, an updated portion representing an unmatched portion of the image information between before and after writing; and emulating a multi-buffering function to switch between a first storage unit for writing the image information and a second storage unit for displaying the image information, wherein the detecting includes detecting the updated portion when it is determined that the cause of the transition is an access to a register by a function requesting to switch to the second storage unit upon the completion of writing the image information.

3. A non-transitory computer-readable recording medium that stores therein a computer program for detecting an update of image information, the computer program, when executed, causing a computer to execute operations comprising:

determining a processor that transitions from a first mode that causes a guest operating system to operate to a second mode that causes a virtual machine monitor managing the guest operating system to operate when previously set transition condition is satisfied and determining a cause of the transition when the processor transitions to the second mode;

detecting, when it is determined that the cause of the transition is an execution of a process related to a completion of writing the image information in an image storage unit on the guest operating system, an updated portion representing an unmatched portion of the image information between before and after writing; and emulating a multi-buffering function to switch between a first storage unit for writing the image information and a second storage unit for displaying the image information, wherein the detecting includes detecting the updated portion when it is determined that the cause of the transition is an access to a register by a function requesting to switch to the second storage unit upon the completion of writing the image information.

4. A non-transitory computer-readable recording medium that stores therein a computer program for detecting an update of image information, the computer program, when executed, causing a computer to execute operations further comprising:

determining a processor that transitions from a first mode that causes a guest operating system to operate to a second mode that causes a virtual machine monitor managing the guest operating system to operate when previously set transition condition is satisfied and determining a cause of the transition when the processor transitions to the second mode;

detecting, when it is determined that the cause of the transition is an execution of a process related to a completion of writing the image information in an image storage unit on the guest operating system, an updated portion representing an unmatched portion of the image information between before and after writing; and emulating a multi-buffering function to switch between a first storage unit for writing the image information and a second storage unit for displaying the image information, wherein the detecting includes detecting the updated portion when it is determined that an exception is generated when a function requesting to switch to the second storage unit upon the completion of writing the image information is executed.

5. A non-transitory computer-readable recording medium that stores therein a computer program for detecting an update of image information, the computer program, when executed, causing a computer to execute operations comprising:

determining a processor that transitions from a first mode that causes a guest operating system to operate to a second mode that causes a virtual machine monitor managing the guest operating system to operate when previously set transition condition is satisfied and determining a cause of the transition when the processor transitions to the second mode;

detecting, when it is determined that the cause of the transition is an execution of a process related to a completion of writing the image information in an image storage unit on the guest operating system, an updated portion representing an unmatched portion of the image information between before and after writing; and emulating a multi-buffering function to switch between a first storage unit for writing the image information and a second storage unit for displaying the image information, wherein the detecting includes detecting the updated portion when it is determined that the cause of the transition is an occurrence of an interrupt by a function requesting to switch to the second storage unit upon the completion of writing the image information.

6. An apparatus for detecting an update of image information, comprising:

an image storage unit configured to store image information;

a processor configured to transition, when a previously set transition condition is satisfied, from a first mode that causes a guest operating system to operate to a second mode that causes a virtual machine monitor managing the guest operating system to operate;

a determining unit that determines, when the processor transitions to the second mode, a cause of the transition;

a detecting unit configured to detect, when the determining unit determines that the cause of the transition is an execution of a process related to a completion of writing the image information in the image storage unit on the guest operating system, an updated portion representing an unmatched portion of the image information between before and after writing; and an emulating unit configured to emulate a multi-buffering function to switch between a first storage unit for writing the image information and a second storage unit for displaying the image information, wherein the detecting unit is configured to detect the updated portion when the determining unit determines that an exception is generated by an exception generating unit when a function requesting to switch to the second storage unit upon the completion of writing the image information is executed.

7. An apparatus for detecting an update of image information, comprising:

an image storage unit configured to store image information;

a processor configured to transition, when a previously set transition condition is satisfied, from a first mode that causes a guest operating system to operate to a second mode that causes a virtual machine monitor managing the guest operating system to operate;

a determining unit configured to determine, when the processor transitions to the second mode, a cause of the transition;

a detecting unit configured to detect, when the determining unit determines that the cause of the transition is an execution of a process related to a completion of writing the image information in the image storage unit on the guest operating system, an updated portion representing an unmatched portion of the image information between before and after writing; and an emulating unit configured to emulate a multi-buffering function to switch between a first storage unit for writing the image information and a second storage unit for displaying the image information, wherein the detecting unit is configured to detect the updated portion when the determining unit determines that the cause of the transition is an occurrence of an interrupt by a function requesting to switch to the second storage unit upon the completion of writing the image information.

8. A method of detecting an update of image information, comprising:

determining a processor that transitions from a first mode that causes a guest operating system to operate to a second mode that causes a virtual machine monitor managing the guest operating system to operate when a previously set transition condition is satisfied and determining a cause of the transition when the processor transitions to the second mode;

detecting, when it is determined that the cause of the transition is an execution of a process related to a completion of writing the image information in an image storage unit on the guest operating system, an updated portion representing an unmatched portion of the image information between before and after writing; and emulating a multi-buffering function to switch between a first storage unit for writing the image information and a second storage unit for displaying the image information, wherein the detecting includes detecting the updated portion when it is determined that an exception is generated when a function requesting to switch to the second storage unit upon the completion of writing the image information is executed.

9. A method of detecting an update of image information, comprising:

determining a processor that transitions from a first mode that causes a guest operating system to operate to a second mode that causes a virtual machine monitor managing the guest operating system to operate when a previously set transition condition is satisfied and determining a cause of the transition when the processor transitions to the second mode;

detecting, when it is determined that the cause of the transition is an execution of a process related to a completion of writing the image information in an image storage unit on the guest operating system, an updated portion representing an unmatched portion of the image information between before and after writing; and emulating a multi-buffering function to switch between a first storage unit for writing the image information and a second storage unit for displaying the image information, wherein the detecting includes detecting the updated portion when it is determined that the cause of the transition is an occurrence of the interrupt by a function requesting to switch to the second storage unit upon the completion of writing the image information.

* * * * *